(12) United States Patent
Kallioniemi

(10) Patent No.: US 10,341,120 B2
(45) Date of Patent: Jul. 2, 2019

(54) METHOD FOR TRANSMITTING ELECTRONIC MAIL MESSAGES SECURELY ENCRYPTED AND A SECURED MAIL SERVER

(71) Applicant: Info Center International ICF Oy, Espoo (FI)

(72) Inventor: Jussi Kallioniemi, Espoo (FI)

(73) Assignee: INFO CENTER INTERNATIONAL ICF OY (FI)

( * ) Notice: Subject to any disclaimer, the term of this patent is extended or adjusted under 35 U.S.C. 154(b) by 40 days.

(21) Appl. No.: 15/568,670

(22) PCT Filed: Jan. 5, 2016

(86) PCT No.: PCT/FI2016/050003
§ 371 (c)(1),
(2) Date: Oct. 23, 2017

(87) PCT Pub. No.: WO2016/170226
PCT Pub. Date: Oct. 27, 2016

(65) Prior Publication Data
US 2018/0152302 A1  May 31, 2018

(30) Foreign Application Priority Data
Apr. 24, 2015  (FI) .................................... 20155306

(51) Int. Cl.
*H04L 12/58* (2006.01)
*H04L 9/32* (2006.01)
(Continued)

(52) U.S. Cl.
CPC ............ *H04L 9/3263* (2013.01); *H04L 9/006* (2013.01); *H04L 9/14* (2013.01); *H04L 9/30* (2013.01);
(Continued)

(58) Field of Classification Search
CPC ...... H04L 51/24; H04L 63/0838; H04L 63/18; H04L 9/3226
See application file for complete search history.

(56) References Cited

U.S. PATENT DOCUMENTS 8,837,739 B1 * 9/2014 Sexton ................. H04L 9/0827
380/278
2004/0249895 A1  12/2004 Way
(Continued)

FOREIGN PATENT DOCUMENTS

| WO | WO 2006/021170 A1 | 3/2006 |
|----|---|---|
| WO | WO 2009156597 A2 | 12/2009 |
| WO | WO 2011055002 A1 | 5/2011 |

OTHER PUBLICATIONS

Finnish Search Report (Application No. 20155306) (1 page—dated Aug. 19, 2015).

*Primary Examiner* — Ellen Tran
(74) *Attorney, Agent, or Firm* — Renner Kenner Greive Bobak Taylor & Weber

(57) ABSTRACT

The object of the invention is a method for transmitting electronic mail messages securely encrypted to a recipient, to whom an unencrypted electronic mail to be delivered cannot be assured of its information security. In the method: the sender (C1) sends an electronic mail message (1) to an electronic mail server (M1) that is his own or that of a known organization using an encrypted electronic mail transmission protocol, and the electronic mail message is marked as secured mail by adding the domain identifier of the secured mail server to the end of the electronic mail address of the recipient, wherein the server M1 sends it as guided by the name service further, using an encrypted transmission protocol, to the secured mail server TP, which stores it. The secured mail server sends to the sender a dispatch acknowledgment request (2.1), to which the sender answers with a (Continued)

dispatch acknowledgment (2.2), in which the sender notifies the mobile telephone number of the recipient or other contact information of the recipient differing from the electronic mail, in order to deliver a password (P2) to the recipient. The secured mail server (TP), upon receiving the acknowledgment of the sender, sends to the electronic mail address of the recipient a notification electronic mail (3), which notifies that a secured mail has arrived and the secured mail server sends further, using some communications channel other than electronic mail, a password (P2), with which the message can be retrieved from the secured mail server (TP). The recipient retrieves the message by an encrypted connection (5) using the information of the notification electronic mail and the password (P2) he received.

6 Claims, 1 Drawing Sheet

(51) Int. Cl.
*H04L 29/06* (2006.01)
*H04L 9/00* (2006.01)
*H04L 9/14* (2006.01)
*H04L 9/30* (2006.01)

(52) U.S. Cl.
CPC .......... *H04L 9/3226* (2013.01); *H04L 9/3247* (2013.01); *H04L 51/04* (2013.01); *H04L 51/24* (2013.01); *H04L 51/28* (2013.01); *H04L 63/0428* (2013.01); *H04L 63/0838* (2013.01); *H04L 63/18* (2013.01)

(56) References Cited

U.S. PATENT DOCUMENTS

| | | |
|---|---|---|
| 2006/0020799 A1 | 1/2006 | Kemshall |
| 2007/0005713 A1* | 1/2007 | LeVasseur ............ H04L 63/126 709/206 |
| 2010/0217984 A1 | 8/2010 | Hill |
| 2011/0010548 A1* | 1/2011 | Stewart ............... H04L 63/0428 713/170 |
| 2011/0202756 A1 | 8/2011 | West |
| 2014/0310514 A1* | 10/2014 | Favero ................. H04L 9/0869 713/153 |

* cited by examiner

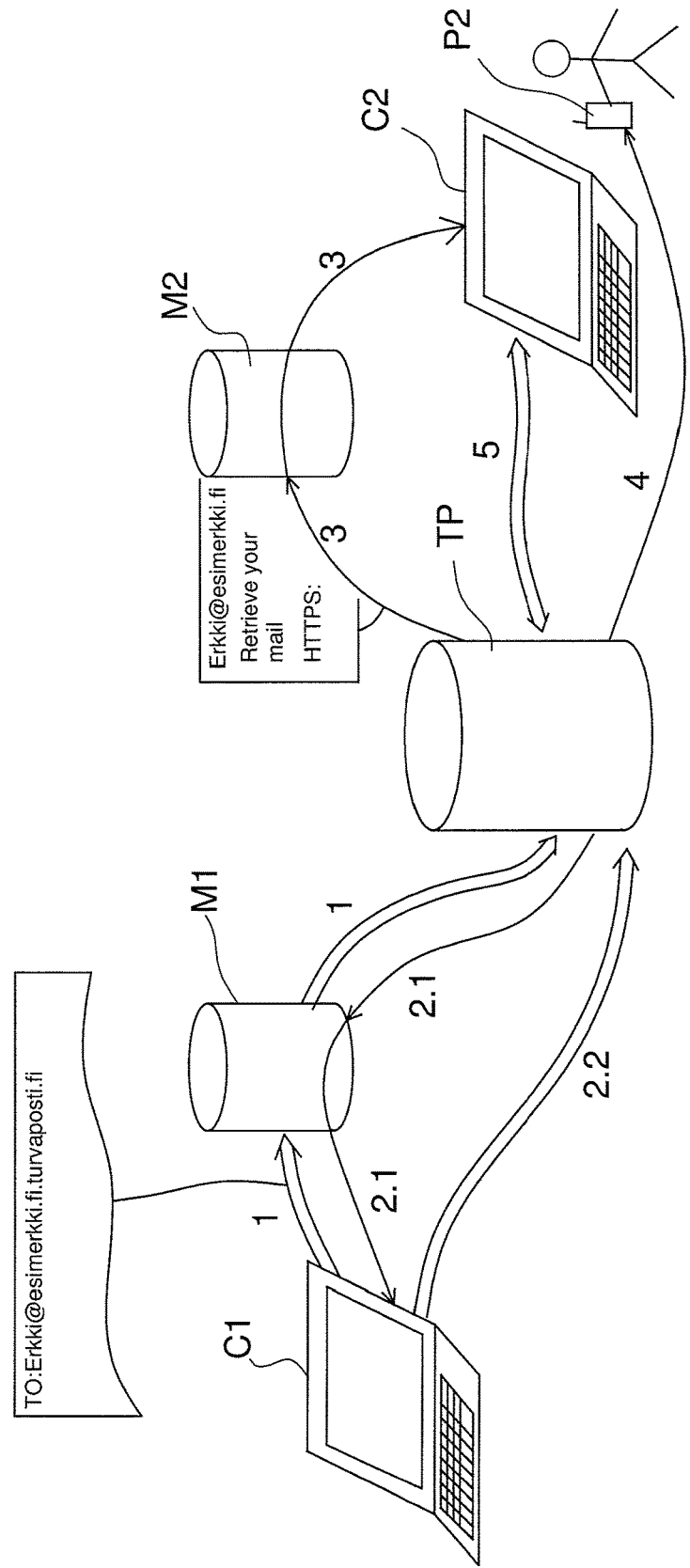

METHOD FOR TRANSMITTING ELECTRONIC MAIL MESSAGES SECURELY ENCRYPTED AND A SECURED MAIL SERVER

The invention relates to transmitting an electronic mail message securely to its recipient.

Transmitting an electronic mail message securely such that only the intended recipient may gain access to the message is problematic. Electronic mail was originally designed for an environment, in which it was possible to adequately rely on the administration of the servers as well as the security of the network itself. Later, encryption and handshaking have been added to electronic mail protocols to ensure information security. Thus, the security of a communications connection between a sending electronic mail server and a receiving electronic mail server is established such that outsiders cannot access the electronic mail traffic. However, this requires that all servers and the work stations or terminals of the sender and recipient use reliable encryption, and that there is no unreliable electronic mail server along the route. If a message must be sent to an electronic mail server managed by an unknown organization or, for example, to a cloud service, it is in no way possible to ensure the secure transmission of the message all the way to the correct recipient.

It is possible to encrypt the message itself, for example, using PGP or GPG encryption (="Pretty Good Privacy" and "Gnu Privacy Guard"). When used properly, these are highly secure. However, the sender and recipient are required to have software, and the sender must have the public key of the recipient for encryption of the message.

It is known from publication WO 2011/055002 A1 an arrangement and a method for delivering an electronic document, comprising a processing entity and memory entity for processing and storing data, and a data transfer entity for receiving and sending data.

Further, it is known from publication WO 2009/156597 A2 a system, a method and a search device for transmitting an e-mail message and a reply message related to it securely over the internet.

It is still further known from publication US 2004/249895 A1 a method of blocking unwanted e-mails.

The object of the invention is to provide a method and a messaging server, by means of which an electronic mail can easily and securely be sent to a recipient without the recipient or sender needing to have any particular software or know-how. Further, according to the invention, it is possible to complicate or preclude the use of counterfeit sender information in the electronic mail.

In the following, the invention is described by means of the accompanying schematic illustration.

FIG. 1 shows, in a schematic illustration, the parts of the system and the steps in the transmission of a message.

In this context, the word "secured mail" is used for internet communication, which is more secure than ordinary electronic mail. This invention relates to the secure transmission of a message such that only the intended recipient gains access to the message. The term "turvaposti (secured mail)" is also a part of the business name of the applicant, but, in this context, the word is used as a general term comprising also other services than the applicant's. The arrows show the steps of the method. The pipe-like arrows show the steps, in which the contents are secured, for example, by encryption. A single line shows a message or connection, which can also be non-encrypted or unsecured.

In FIG. 1, the message of the user of computer C1 is delivered to the user of computer C2. The user of the electronic mail program of computer C1 can guide the electronic mail he has sent via secured mail by adding a suitable identifier to the identifier information of the electronic mail. In step 1, the message is sent via the electronic mail server M1 used by computer C1 to the secured mail server. The arrow of step 1 is drawn as pipe-like to show an encrypted connection. The server M1 should thus use some known encrypted electronic mail transmission protocol, in order that the message could securely be delivered to the secured mail server TP. It is generally easy for the organization of the user of C1 to ensure the use of an encrypted protocol and, as needed, to introduce in the server a forced encrypted connection also between client computers and the sending server M1. The connection between the servers can be, for example, SMTPS, i.e. SMTP Secure, which uses SSH or TLS tunnelling in the transport layer. In this case, in connection with the SSH tunnel, public key certificates can be used to verify the servers. As the certificates can be used PKI signed keys, which are granted by the certificate authorities.

Preferably, the message is guided from the M1 server to the secured mail server TP simply by adding a domain identifier to the end of the electronic mail address of the electronic mail recipient. In this case, the electronic mail is sent as guided by the name service further to be sent to the secured mail server TP. There is no need to make any changes to the electronic mail programs or servers of the organization of the sender.

The domain identifier added to the end of the electronic mail, for example, "turvaposti.fi" guides mail messages automatically to a secured mail server. In place of the domain of turvaposti.fi can naturally be any suitable domain name whatsoever.

The secured mail server TP can identify the sender by the certificates used by the electronic mail server M1. The server of the sender can identify the certificate of the secured mail server at least if the domain name of the secured mail server is verified by an extended identifier (Extended Validation certificate, EV), and both servers support this. Self-made identifiers can also be used.

An encrypted connection can be ensured continuous as long as at least one of the parties is able to inspect the certificate of the opposite party and to identify the encryption keys of the opposite party as genuine. Thus, it is enough if the secured mail server can identify the certificate of the electronic mail server of the sender. If identification is not successfully performed, it is possible to refuse to accept the message and send an error message by electronic mail to the sender and, at the same time, to request the following of a secure https link to transfer the message directly to a secured mail server. It is also possible to allow self-formed identifiers or an encrypted connection without identification in the future.

The secured mail server stores the message and ensures the correctness of the sender by a dispatch acknowledgment request message 2.1. It is possible to send this message without encryption, because there is no need to send in it information, which would be sensitive. However, as a countermeasure against man-in-the-middle attacks, it is recommended to also encrypt this dispatch acknowledgment request message. This way, the use of counterfeit sender information is more reliably prevented, because capturing the dispatch acknowledgment request message and replying to it is not successful without capturing the electronic mail account of the sender. The message 2.1 can be sent as an electronic mail to the original sender, or a secured mail server can use another route of communication for the acknowledgment request message, for example, an SMS message to a telephone number provided by the sender. To the message 2.1 is answered directly over the electronic mail server M1 using a message or a contact 2.2.

If the electronic mail server M1 and the secured mail server allow electronic mail messages, whose From: field is unfamiliar, the sender of the message can change his from address such that the dispatch acknowledgment request message arrives in some other place than the address of the sender account of the M1 server. The dispatch acknowledgment request message can also be sent to a ReplyTo: address. However, the dispatch acknowledgment request message can be used to assure that the address of the dispatch acknowledgment request message is in the possession of the sender of the original message and is a functioning electronic mail address.

An answer to the dispatch acknowledgment request 2.1 can be made using an encrypted www connection or it is possible to answer by a text message or dispatch acknowledgment electronic mail, provided that dispatch acknowledgment mail is secure between C1-M1-TP. If the mobile telephone number of the recipient or other alternative contact information for electronic mail is not yet known, the information can be requested during an encrypted www connection, or requested that it be sent as an SMS reply or an electronic mail reply. Other contact information is required for sending the password P2 to the recipient in step 4.

The secured mail server TP notifies of a message that has arrived by electronic mail to the recipient by electronic mail 3. This message does not contain information about the contents of the message itself. The sender information can possibly be included in some form, in order that the recipient would know, for example, the urgency of the message. This step is drawn in the FIGURE as non-encrypted as a single line. The encryption of this step is not selectable by the secured mail server or the sender, thus it is not possible to rely on that the message could remain encrypted all the way to the recipient. It is also not possible to rely on the electronic mail server and its administrator. The user on computer C2 receives information regarding a secured mail that has arrived, and the message has a link and/or instructions to securely retrieve the message via an encrypted connection 5 from the secured mail server TP.

In the FIGURE, the example message is sent to a modified electronic mail address Erkki@esimerkki.fi.turvaposti.fi. In this case, the address of the recipient is Erkki@esimerkki.fi, and as the identifier is used the addition of turvaposti.fi. This is a handy manner in that there is no need to make any changes to the electronic mail server used by the sender to guide the message to the secured mail server TP. A dispatch acknowledgment does not need to be requested if the secured mail server already knows the password delivery address of the recipient. The secured mail server can also send a reading acknowledgment to the electronic mail address of the sender, when the recipient retrieves or reads the message itself.

The invention claimed is:

1. A method for transmitting electronic mail messages securely encrypted to a recipient, to whom an unencrypted electronic mail to be delivered cannot be assured of its information security, in which method:

the sender sends an electronic mail message to an electronic mail server that is his own or that of a known organization using an encrypted electronic mail transmission protocol, the electronic mail message is marked as secured mail by adding the domain identifier of the secured mail server to the end of the electronic mail address of the recipient, wherein the server sends it as guided by the name service further, using an encrypted transmission protocol, to the secured mail server, which stores it, and the secured mail server sends to the sender a dispatch acknowledgment request, to which the sender answers with a dispatch acknowledgment, wherein in the method, the sender notifies in a dispatch acknowledgment the mobile telephone number of the recipient or other contact information of the recipient differing from the electronic mail, in order to deliver a password to the recipient, after which the secured mail server, upon receiving the acknowledgment of the sender, sends to the electronic mail address of the recipient a notification electronic mail, which notifies that a secured mail has arrived and the secured mail server sends further, using some communications channel other than electronic mail, a password, with which the message can be retrieved from the secured mail server, and the recipient retrieves the message by an encrypted connection using the information of the notification electronic mail and the password he received.

2. A method according to claim 1, in which the dispatch acknowledgment is made by following a www link of the secure connection in a dispatch acknowledgment request.

3. A method according to claim 1, in which the dispatch acknowledgment is some other kind of message than an electronic mail message, for example, an instant message or an SMS message.

4. A method according to claim 1, in which a dispatch acknowledgment is omitted, provided that the recipient and sender are already identified and the secured mail server already has the required information.

5. A method according to claim 1, in which the secured mail server identifies the sending electronic mail server by certificates.

6. A secured mail server for transmitting electronic mail messages to a recipient such that only the intended recipient can gain access to the electronic messages, which secured mail server is adapted:

to receive electronic mails from the electronic mail servers of senders, the recipients of whose address domain name information is modified such that a domain identifier indicating a secured mail server is added to the end of the domain name, to use an encrypted connection to receive an electronic mail from the electronic mail server of the sender, to store the received message, and to send a dispatch acknowledgment request to the sender of the electronic mail, wherein in the dispatch acknowledgment request is requested a second contact information of the recipient for delivering a password, wherein the secured mail server, upon receiving the acknowledgment of the sender, is adapted to send to the recipient a password, and to deliver the message to the recipient after authentication with the password using a secure connection to transfer the message to the recipient.

\* \* \* \* \*